United States Patent [19]

Dünwald et al.

[11] Patent Number: 4,853,261

[45] Date of Patent: Aug. 1, 1989

[54] PROCESS FOR THE PREPARATION OF COATINGS WITH HYDANTOIN STRUCTURES BY THE REACTION OF COMPOUNDS CONTAINING CARBODIIMIDE GROUPS WITH UNSATURATED CARBOXYLIC ACIDS

[75] Inventors: Willi Dünwald; Hans Schlegel, both of Leverkusen; Reinhard Halpaap; Josef Pedain, both of Cologne, all of Fed. Rep. of Germany

[73] Assignee: Bayer Aktiengesellschaft, Leverkusen, Fed. Rep. of Germany

[21] Appl. No.: 181,058

[22] Filed: Apr. 13, 1988

[30] Foreign Application Priority Data

Apr. 24, 1987 [DE] Fed. Rep. of Germany ....... 3713670

[51] Int. Cl.$^4$ .............................................. C08G 18/08
[52] U.S. Cl. ............................ 427/388.1; 427/388.2; 528/45
[58] Field of Search ............. 528/45; 427/388.1, 388.2

[56] References Cited

U.S. PATENT DOCUMENTS

| | | | |
|---|---|---|---|
| 4,096,291 | 6/1978 | Dunwald et al. | 427/120 |
| 4,246,393 | 1/1981 | Zecher et al. | 528/75 |
| 4,517,353 | 5/1985 | Zecher et al. | 528/45 |
| 4,565,843 | 1/1986 | Dunwald | 524/89 |
| 4,659,795 | 4/1987 | Tsutsui et al. | 526/301 |

*Primary Examiner*—Maurice J. Welsh
*Assistant Examiner*—L. Henderson
*Attorney, Agent, or Firm*—Connolly and Hutz

[57] ABSTRACT

The invention relates to a process for the production of coatings based on polymers having a hydantoin structure by reacting blocked polyisocyanate carrying carbodiimide and/or uretone imine groups with α,β-unsaturated dicarboxylic acids or derivatives thereof at 50° to 700° C. said reaction being carried out on the substrate to be coated.

2 Claims, No Drawings

PROCESS FOR THE PREPARATION OF COATINGS WITH HYDANTOIN STRUCTURES BY THE REACTION OF COMPOUNDS CONTAINING CARBODIIMIDE GROUPS WITH UNSATURATED CARBOXYLIC ACIDS

BACKGROUND OF THE INVENTION

This invention relates to a process for the preparation of coatings of polymers having hydantoin ring structures by the reaction of blocked isocyanates containing carbodiimide and/or optionally uretone imine groups with α,β-unsaturated dicarboxylic acids or with derivatives thereof said reaction being carried out on the substrates to be coated.

It is known that substituted hydantoins are obtained when α,β-unsaturated carboxylic acid derivatives are reacted with isocyanates (DE-OS No. 2 654 112) and that improvements in the resulting products may be obtained if the isocyanates used are converted into carbodiimides before the preparation of the hydantoins (e.g. DE-OS Nos. 3 144 700 and 3 247 350 which equals U.S. Pat. No. 4,517,353). The polyhydantoins may be used, for example, as heat resistant plastics, especially in the field of electrical insulation (e.g. FR-PS No. 1 484 694).

It is known from DE-OS No. 3 247 350 that isocyanates which are partially blocked with lactams can be converted into carbodiimides which in turn can be reacted with α,β-unsaturated carboxylic acids to form polyhydantoins. In this process, the α,β-unsaturated compound is slowly added with cooling.

It was therefore not to be expected that mixtures which are stable in storage at normal temperature could be prepared from the components according to the invention.

A problem generally encountered in the production of films and coatings based on polycarbodiimides is that it is necessary to start with relatively large molecular units so that the stoving process for producing the polymer which forms the coating or film can be carried out with relatively few bonding or cross-linking reactions and can be completed within a short time. This means that the lacquer solution has a high viscosity and a relatively low solids content. If the compounds are composed of low molecular weight units, they must undergo a larger number of cross-linking or bonding reactions which require a longer reaction time which cannot be simply compensated by increasing the temperature as this might lead to the formation of blisters or surface defects. Another possibility of obtaining the lacquer from preliminary stages with smaller molecules so that a low viscosity lacquer containing a larger amount of film forming material could be obtained would be to increase the reactivity considerably by means of special catalysts, but this could have a disadvantageous effect on the viscosity during a continuous process.

It has now been found that a film of polymer lacquer can be obtained from low molecular weight starting materials which can be applied directly to the substrate without the elaborate process of preparing an intermediate polymer stage.

SUMMARY OF THE INVENTION

The present invention relates to a process for the production of coatings containing hydantoin rings which comprises reacting at temperatures of from 50° to 700° C. α,β-unsaturated dicarboxylic acids or derivatives thereof with blocked polyisocyanates containing carbodiimide and/or uretone imine groups characterized in that the reaction is carried out on the substrate to be coated.

DETAILED DESCRIPTION OF THE INVENTION

The process according to the invention constitutes a considerable advance. It avoids the time and energy consuming preparation of intermediate stages from which workable low viscosity solutions with a low solids content must first be prepared before the final polymer can be obtained.

The films and coatings obtainable from the mixture according to the invention have exceptional hardness and improved solvent resistance, e.g. to styrene. The electrical properties are satisfactory. The tan δ graph as a function of the temperature (determination according to VDE 0303/Part 4) only ascends at high temperatures.

The blocked isocyanates containing carbodiimide and/or uretone imine groups suitable for the process according to the invention are described, for example, in DE-OS No. 3 600 766. The content of these compounds of carbodiimide groups (calculated as —N=C=N—) is generally from 0 to about 25% by weight, preferably from about 1 to 20% by weight, their content of uretone imine groups (calculated as structural units of the formula $C_2N_3O$) is generally 0 to about 30% by weight, preferably 0 to about 25% by weight, the sum of carbodiimide and uretone imine groups (calculated as —N=C=N—) amounts generally to about 0,5 to 25% by weight, preferably to about 1 to 20% by weight and their content of blocked isocyanate groups (calculated as NCO) is generally from about 1 to about 25% by weight, preferably from about 5 to about 22% by weight.

Unsaturated dicarboxylic acids are, for example, maleic acid or fumaric acid, α,β-unsaturated dicarboxylic acid derivatives suitable for the process according to the invention are desscribed e.g. in DE-OS No. 3 247 350 (=U.S. Pat. No. 4,517,353). Preferred are derivatives of maleic acid such as monoalkyl esters having from 1 to 4 carbon atoms in the alkyl rest or maleic acid monoamides having N,N-disubstituted amide groups the substituents of the amide groups being alkyl radicals with 1 to 4 carbon atoms. The corresponding derivatives of fumaric acid may also be used, however, they are less preferred than said derivatives of maleic acid.

The process according to this invention covers the preparation of lacquers on heat resistant substrates, in particular metals or glass fabrics. It is preferably used for preparing wire enamels.

The reactants are used in such proportions in the process according to the invention that the ratio of the sum of equivalents of carbodiimide groups and uretone imine groups in the blocked polyisocyanates according to the invention to the number of equivalents of α,β-unsaturated carboxylic acid derivatives is from 0.1:1 to 10:1, preferably from 0.2:1 to 4:1, most preferably from 0.5:1 to 2.5:1.

The properties of the plastics and lacquers obtained may be regulated by the proportions employed.

Depending on the proportion of blocked isocyanate groups present in the blocked polyisocyanates used according to the invention, low molecular weight polyhydric alcohols may be used as reactants in addition to the α,β-unsaturated carboxylic acid derivatives which are essential to this invention. This provides another possibility of regulating the properties.

These low molecular weight, polyhydric alcohols may be used in such proportions that the ration of the equivalents of hydroxyl groups in the polyols to the equivalents of blocked isocyanate groups in the blocked polyisocyanates, including the equivalents of uretone imine groups optionally present, is from 0:1 to 10:1, preferably from 0:1 to 2:1, most preferably from 0:1 to 1.2:1.

The low molecular weight polyhydric alcohols may also be used as "associates" together with ε-caprolactam especially if they are present in solid form (K. Wagner, Angewandte Makromolekulare Chemie, 37, page 59 seq., 1974). the proportion of alcohol to ε-caprolactam used corresponds generally to a molar ration of 1:1 although it would also be possible to use solutions of the solid alcohols in the associates (excess of alcohol e.g. up to molar ration of 4:1).

Suitable low molecular weight polyhydric alcohols have a molecular weight below 400 and contain from 2 to 4 hydroxyl groups e.g. as described in DE-OS No. 3 600 766.

The mixtures which are suitable for the purpose of the invention may be used directly as lacquers or in combination with a suitable solvent.

Suitable solvents are mentioned e.g. in DE-OS No. 3 600 766. Suitable solvents are, for example, methoxypropyl acetate, cresol or xylene or mixtures of such solvents. Curing of the reaction products according to the invention may be influenced not only by varying the temperature but also by the addition of catalysts. Suitable catalysts are mentioned, for example, in DE-OS No. 3 600 766, e.g. reaction products of amines with carbonyl compounds such as aldimines based on aliphatic aldehydes such as butyraldhyde and aromatic amines such as aniline or metal compounds such as tin octoate or zinc octoate.

The coating compositions consisting essentially of said reaction mixtures may be applied on the substrates to be coated in accordance with the known methods of coating technology i.e., for example, by spraying, brushing or dipping. Suitable heat-resistant substrates are, for example, metals, especially wires or glassfibres. The process of the invention is especially suitable for the manufacture of wire enamels.

The production of the lacquer films take place upon heating of the coated substrates to temperatures of from 50° to 700° C., preferably 80° to 500° C.

The coatings prepared according to the invention are distinguished by their temperature resistance, the high position of the tan δ intersection point (determination according to VDE 0303/Part 4) and the resistance to solvents (e.g. styrene). Furthermore, the lacquer solutions prepared according to the invention may be mixed with other polymers in wide ranges of proportions, e.g. with polyesters, polycarbonates or polyamidimides.

The percentage in the following examples relate to the weight.

EXAMPLES

Preparation of a blocked polyisocyanate I containing carbodiimide groups (according to DE-OS 3 600 766)

216 g of cresol (commercial isomeric mixture) are added within about 30 minutes, starting at 80° C., to a mixture of 174 g of 2,4-diisocyanatotoluene and 2,6-diisocyanatotoluene (ratio by weight 8:2) and 250 g of 4,4'-diisocyanatodiphenyl methane and the resulting mixture is maintained at 120° C. for 6 hours. When an isocyanate content of 13.0% is reached (NCO-$_{theor.}$=13.1%), the reaction mixture is diluted with 256 g of 1-methoxypropyl-2-acetate.

Carbodiimide formation is catalysed by the addition of 2 g of methylphospholine oxide (a commercial mixture of 1-methyl-1-phospha-2-cyclopentene-1-oxide and 1-methyl-1-phospha-3-cyclopentene-1-oxide) at 60° C. 22 liters of $CO_2$ (about 92%) are split off in about 15 hours.

The solution of a blocked polyisocyanate having the following characteristics is obtained.

| | |
|---|---|
| Concentration: | about 70% |
| Viscosity: | η(23° C.) = 8,000 mPas |
| Free isocyanate content: | <0.1% |
| Blocked isocyanate (calculated) | 9.9% |
| NCN content (calculated) | 4.7% |

EXAMPLE 1

850 g of polyisocyanate I and 130 g of maleic acid monomethyl ester are dissolved in 228 g of methoxypropyl acetate. The solids content is 60%. The time outflow time through a 4 mm cup according to DIN 53 211 at 23° C. is 150 seconds.

A sample of this solution is applied on a metal test sheet and stoved for 30 minutes at 200° C. to form a clear film having a dry film thickness of approximately 30 μm. The tan δ intersection point, determined according to VDE 0303/Part 4, is above 300° C. The resistance to styrene was tested by storing a strip of the lacquered sheet in monostyrene at 120° C. for 2 hours. The pencil hardness (DIN No. 46 453, 12.3) was then determined. the pencil hardness of the lacquer film was unchanged 4 H after this treatment.

EXAMPLE 2

850 g of polyisocyanate I and 260 g of maleic acid monomethyl ester are dissolved in 1028 g of kresol/xylene (1:1 parts by weight). 1% of an aldimine of aniline/butyr aldhehydr, calculated on the solids content, is added as catalyst to the solution. The solids content is 40%. The flow time through a 4 mm cup according to DIN 53 211 at 23° C. is 17 seconds. The lacquer solution is applied to a copper wire 0.7 mm in diameter in a vertical oven 4 metres in length at an oven temperature of 400° C. until the diameter of the wire has increased by 50 to 60 μm. A lacquered copper wire with excellent properties is obtained over a wide operating range (8 to 23 m/min): tan δ intersection point (determined according to VDE 0303/Part 4): >300° C., cut through temperature (DIN No. 46 453/2): >300° C.; after 30 minutes storage at 60° C. in ethanol, the pencil hardness (DIN No. 46 453/12.3) is 4 H.

The resistance to styrene was measured by storing the lacquered wire in monomeric styrene at 120° C. for 2 hours. The pencil hardness (DIN No. 46 453/12.3) was then again determined. The pencil hardness of the lacquer film was unchanged after this treatment.

EXAMPLE 3

850 g of polyisocyanate I, 390 g of maleic acid monomethyl ester and 246 g of an association of ε-caprolactam and trishydroxyethyl-isocyanurate (1:2 molar) corresponding to 25% by weight, based on the weight of the solids content of polyisocyanate I/maleic acid monomethyl ester, are dissolved in 1592 g of cyclohexanone/N-methylpyrrolidone (1:1 parts by weight). 1% of an aldimine of aniline/butyraldehyde, calculated on the solids content, are added to the solution as catalyst. The solids content is 40%. The flow time through a 4 mm cup according to DIN 53 211 at 23° C. is 16 seconds.

The lacquer solution is applied to a copper wire 0.7 mm in diameter in a vertical oven 4 meters in length at an oven temperature of 400° C. until the diameter has increased by 50 to 60 μm. A lacquered copper wire with excellent properties is obtained over a wide operating range (8 to 23 m/min):

At a lacquering speed of 17 meters per minute, the level of the tan δ intersection point (VDE 0303/Part 4) is at 200° C., the external fibre elongation (DIN 46 453/8.1) is 88%, the heat shock (DIN No. 46 453/9) is >260° C., the cut through temperature (DIN No. 46 453/2) is 250° C. and the pencil hardness (DIN No. 46 453/12.3) after 30 minutes storage in ethanol at 60° C. is 4 H.

The resistance to styrene was tested by storing the lacquer wire in monomeric styrene at 120° C. for 2 hours. The pencil hardness was then determined.

The hardness of the lacquer was unchanged after this treatment (4 H). This lacquer wire can be coated with tin at 420° C. (DIN 46 453/17). The tinning time is 1.5 seconds.

What is claimed is:

1. Process for the production of coatings containing hydantoin rings which comprises reacting at temperatures of from 50° to 700° C. $\alpha,\beta$-unsaturated dicarboxylic acids or derivatives thereof selected from the groups consisting of monoalkyl esters having from 1 to 4 carbon atoms in the alkyl moiety and N,N-disubstituted mono-amides substituted by alkyl having 1 to 4 carbon atoms, with blocked polyisocyanates containing carbodiimide and/or uretone imine groups characterized in that the reaction is carried out on the substrate to be coated.

2. The process of claim 1 characterized in that low molecular weight alcohols having a molecular weight of below 400 and from 2 to 4 hydroxyl groups per molecule are also added to the reaction mixture.

* * * * *